US006473155B1

(12) United States Patent
Kim

(10) Patent No.: US 6,473,155 B1
(45) Date of Patent: Oct. 29, 2002

(54) IMAGE FORMING APPARATUS

(75) Inventor: Young-Min Kim, Gyeongsangbuk-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 70 days.

(21) Appl. No.: 09/697,592

(22) Filed: Oct. 27, 2000

(30) Foreign Application Priority Data

Oct. 27, 1999 (KR) ............................................ 99/46778

(51) Int. Cl.[7] ......................... G03B 27/62; G03G 15/02
(52) U.S. Cl. .......................... 355/47; 399/114; 399/119
(58) Field of Search ........................... 355/47; 399/111, 399/114, 106–110, 116, 119

(56) References Cited

U.S. PATENT DOCUMENTS 4,588,280 A * 5/1986 Ogawa et al. .............. 399/114
5,231,453 A * 7/1993 Nakai et al. ................ 399/114

FOREIGN PATENT DOCUMENTS

| | | | |
|---|---|---|---|
| JP | 59-34555 | * | 2/1984 |
| JP | 63-216070 | * | 9/1988 |
| JP | 08-50443 | * | 2/1996 |

* cited by examiner

*Primary Examiner*—D. Rutledge
(74) *Attorney, Agent, or Firm*—Robert E. Bushnell, Esq.

(57) ABSTRACT

An image forming apparatus having a main body, a cover for opening and closing a portion of the main body, a laser scanning unit for irradiating a laser light on a photosensitive drum disposed at a developing device, a exposing hole which is formed at a side of the developing device to exposing a surface of the photosensitive drum to the light from the laser scanning unit and a protecting plate for covering the exposing hole to protect the exposing hole from-external light when the cover is opened, thereby preventing the photosensitive drum to be exposed to natural light and maintaining the photosensitive drum in an optimum operational state.

14 Claims, 5 Drawing Sheets

IMAGE FORMING APPARATUS

CLAIM OF PRIORITY

This application makes reference to, incorporates the same herein, and claims all benefits accruing under 35 U.S.C. §119 from my application IMAGE FORMING APPARATUS filed with the Korean Industrial Property Office on Oct. 27, 1999 and there duly assigned Ser. No. 46778/1999.

BACKGROUND OF THE INVENTION

1. Field of the Invention

The present invention relates to an image forming apparatus, more particularly, to an image forming apparatus which is adapted to prevent a photosensitive drum from being irradiated with external light when a cover of the image forming apparatus is opened.

2. Description of the Related Art

In image forming apparatuses, a laser scanning unit illuminates a photosensitive drum to form an image thereon. When a sheet of recording medium passes between the photosensitive drum and the transfer roller, the image formed on the photosensitive drum is transferred onto the sheet of recording medium. However a problem occurs when the cover of the image forming apparatus has to be opened. Light from the outside illuminates the photosensitive drum causing the image formed on the photosensitive drum from the laser scanning unit to be ruined.

What is needed is a protective covering for the photosensitive drum that prevents light from the outside to illuminate the photosensitive drum when the cover is opened. This will prevent spoiling the image on the photosensitive drum when the cover to the image forming apparatus is opened.

SUMMARY OF THE INVENTION

It is therefore an object to provide an image forming apparatus that provides a protective plate that covers the photosensitive drum and prevents light from outside the image forming apparatus from illuminating the photosensitive drum when the cover to the photosensitive drum is opened.

It is also an object of the present invention to provide a method that prevents light from outside the image forming apparatus from destroying an image formed on a photosensitive drum by a laser scanning unit when the cover of the image forming apparatus is opened.

It is further an object to provide a protective cover that automatically covers the photosensitive drum When the cover of the image forming apparatus is opened.

It is still also an object of the present invention to provide an image forming apparatus in which an exposed portion of the photosensitive drum, through which light from the laser scanning unit is irradiated, is protected from external light when the developing device is separated from the main body of the image forming apparatus.

To achieve the above objects and other advantages, there is provided an image forming apparatus having a main body, a cover for opening/closing a portion of the main body, a laser scanning unit for irradiating a laser light on a photosensitive drum disposed at a developing device, a exposing hole which is formed at a side of the developing device to exposing a surface of the photosensitive drum to the light from the laser scanning unit and a protecting plate for covering the exposing hole to protect the exposing hole from external light when the cover is opened. Preferably, the developing device is provided with a supporting portion which is engaged with the protecting plate, and the cover is formed with an operational protrusion to rotate the protecting plate and thus expose the exposing hole. Preferably, the protecting plate is formed with a supporting protrusion which is engaged with the supporting portion, and the supporting protrusion has a returning spring for returning the protecting plate when an external force exerted by the operational protrusion is eliminated.

BRIEF DESCRIPTION OF THE DRAWINGS

A more complete appreciation of the invention, and many of the attendant advantages thereof, will bereadily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
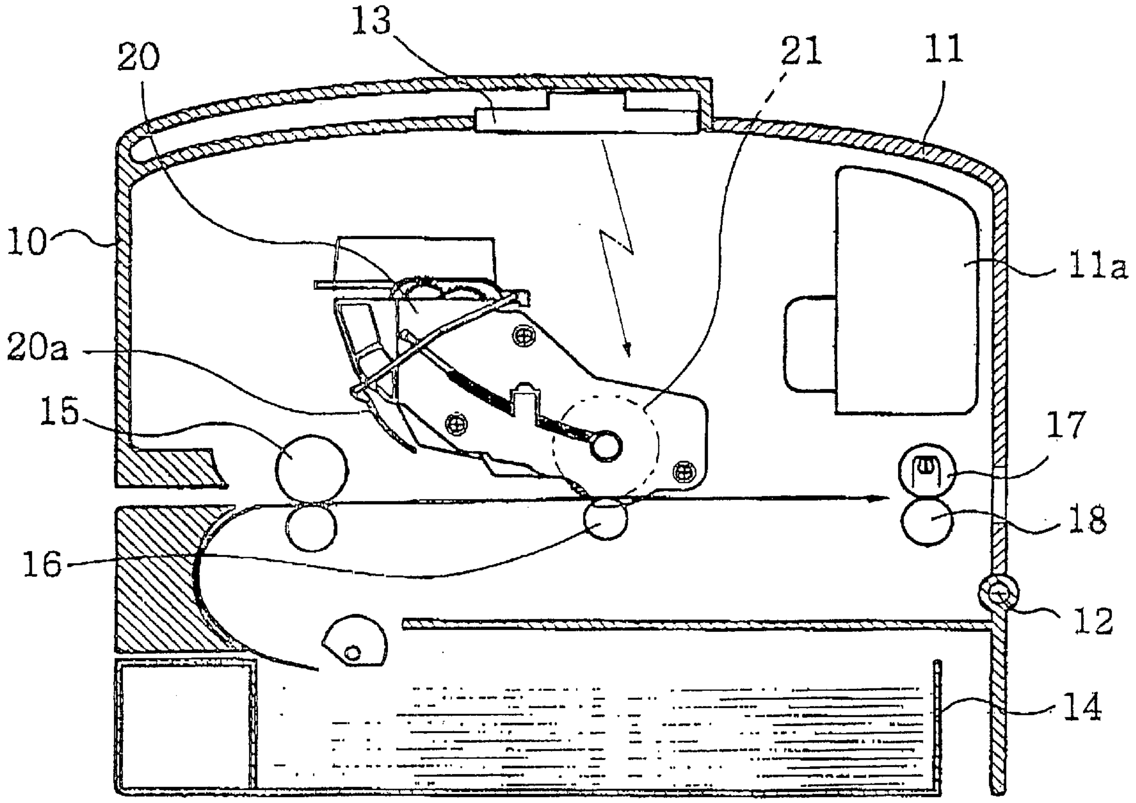
FIG. 1 is a schematic cross-sectional view showing an image forming apparatus.

Turning to FIG. 1, an image forming apparatus includes a main body 10, a cover 11 which is hinged on a front portion of the main body 10 and provided with a duct structure 11 a formed at an inner portion of the main body 10, a paper cassette 14 for holding a stack of paper, which is disposed at a lower portion of the main body 10, and a developing device 20 which is mounted in the main body 10 and provided with a toner and a photosensitive drum 21.

Mounted on a lower portion of the developing device 20 is a transfer roller 16 contacted with the photosensitive drum 21. A pressure roller 18 and a heat roller 17 are respectively disposed at a front side of the transfer roller 16. On a rear side of the transfer roller 16, there is provided a feed roller 15.

Meanwhile, the developing device is provided with a cover 11 for covering a portion of the photosensitive drum 21, which is exposed through a lower portion of the developing device 20, when the developing device 20 is separated from the main body 10. Cover 11 is attached to hinge 12 to allow the cover 11 to rotate open and closed. A laser scanning unit (LSU) 13 is disposed at an upper portion of the main body 10 to irradiate a laser beam to the portion of the photosensitive portion 21 exposed through an upper portion of the developing device 20. When a sheet of recording medium jams in an image forming apparatus, the user can 1) open cover 11 to remove the jam, or 2) separate developing unit 20 from main body 101 to remove the jam.

In the developing device 20 mounted at the conventional image forming apparatus, when the developing device 20 was separated from the main body 10, the exposed portion of the photosensitive drum 21, which was exposed through the lower portion of the developing device 20, was protected by a protecting plate 20*a* provided at a lower portion of the developing device 20. However, the exposed portion of the photo sensitive drum 21, which was exposed through the upper portion of the developing device 20, could not be protected from the external light such as natural light. Therefore, there is a problem that, since the photosensitive drum 21 is exposed to the external light and thus a surface of the photosensitive drum 21 is damaged, a corrupted printing line is generated in a horizontal direction of a paper according to a rotational period of the photosensitive drum 21 when printing, thereby lowering a printing quality.

Figure 2:
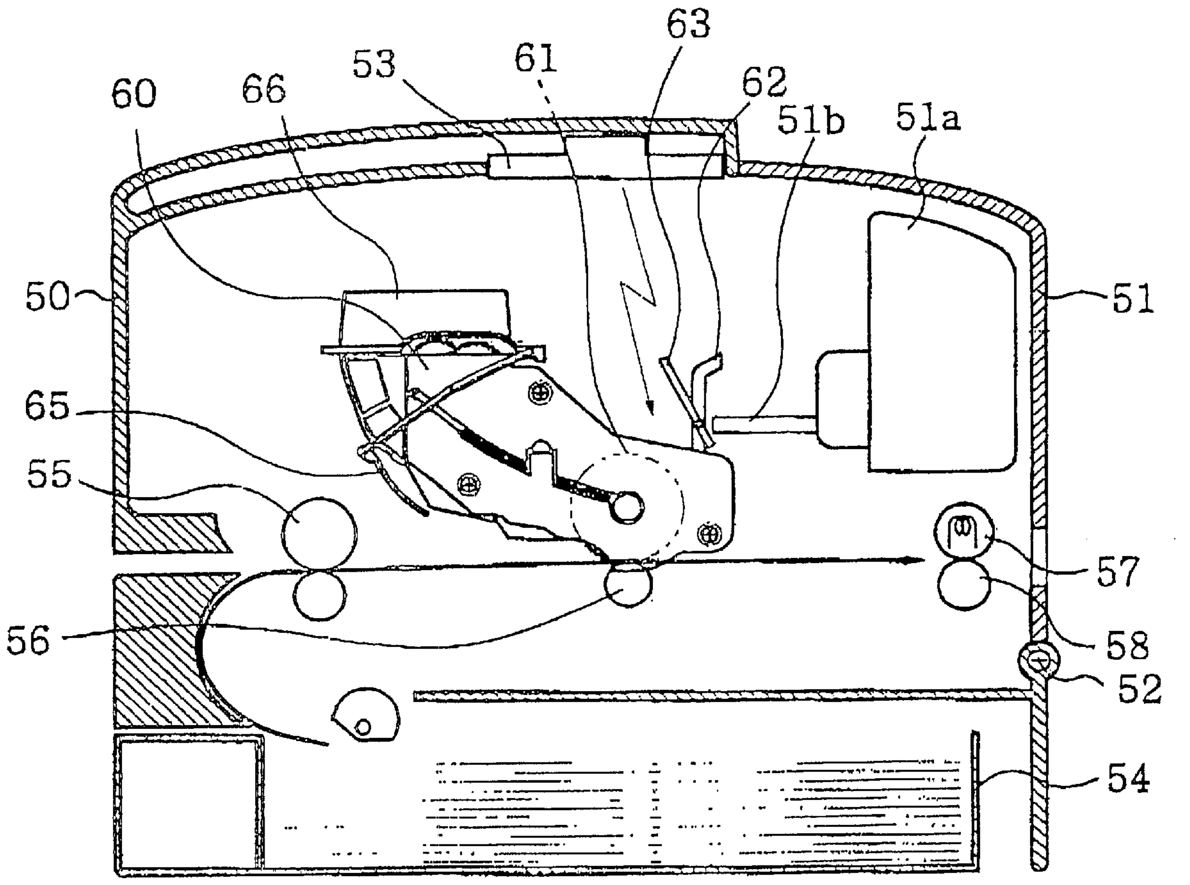
FIG. 2 is a schematic cross-sectional view showing an image forming apparatus according to the present invention, in which a cover is closed.
Figure 3:
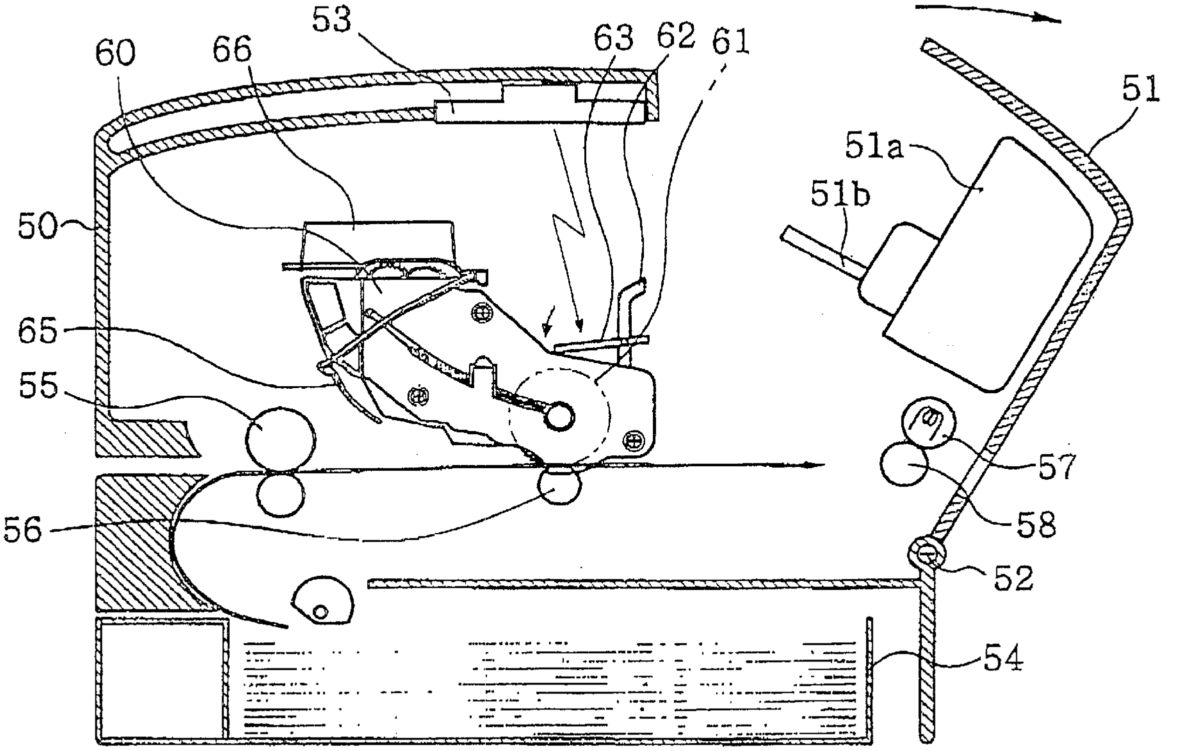
FIG. 3 is a schematic cross-sectional view showing the image forming apparatus according to the present invention, in which a cover is closed.

As shown in FIGS. 2 and 3, an image forming apparatus according to the present invention is provided with a main body 50 formed into a rectangular box type and a cover 51 which is hinged on a front face of the main body 50 to open/close the front face of the main body 50. Cover 51 can rotate open as in FIG. 3 about hinge 52 and rotate closed, as in FIG. 2 about hinge 52. At a lower portion of the body 50, there is disposed a paper cassette 54 for loading a stack of paper. A laser scanning unit 53 are disposed at an upper portion of the main body 50. Mounted at an inner side of the main body 50 is a developing device 60, and a duct structure 51*a* is provided at an inner side of the cover 51 to support the developing device 60.

Further, at a lower portion of the developing device 60, there is provided a transfer roller 56 contacted with a photosensitive drum 61 disposed in the developing device 60. A feed roller 55 is disposed at a rear side of the main body 50 to feed a paper loaded in the paper cassette 54. A heat roller 57 and a pressure roller 58 are respectively provided at a front side of the main body 50 to heat a paper sheet, on which an image is formed while passing through the photosensitive drum 61 and the transfer roller 56, and then press the paper sheet.

Figure 4:
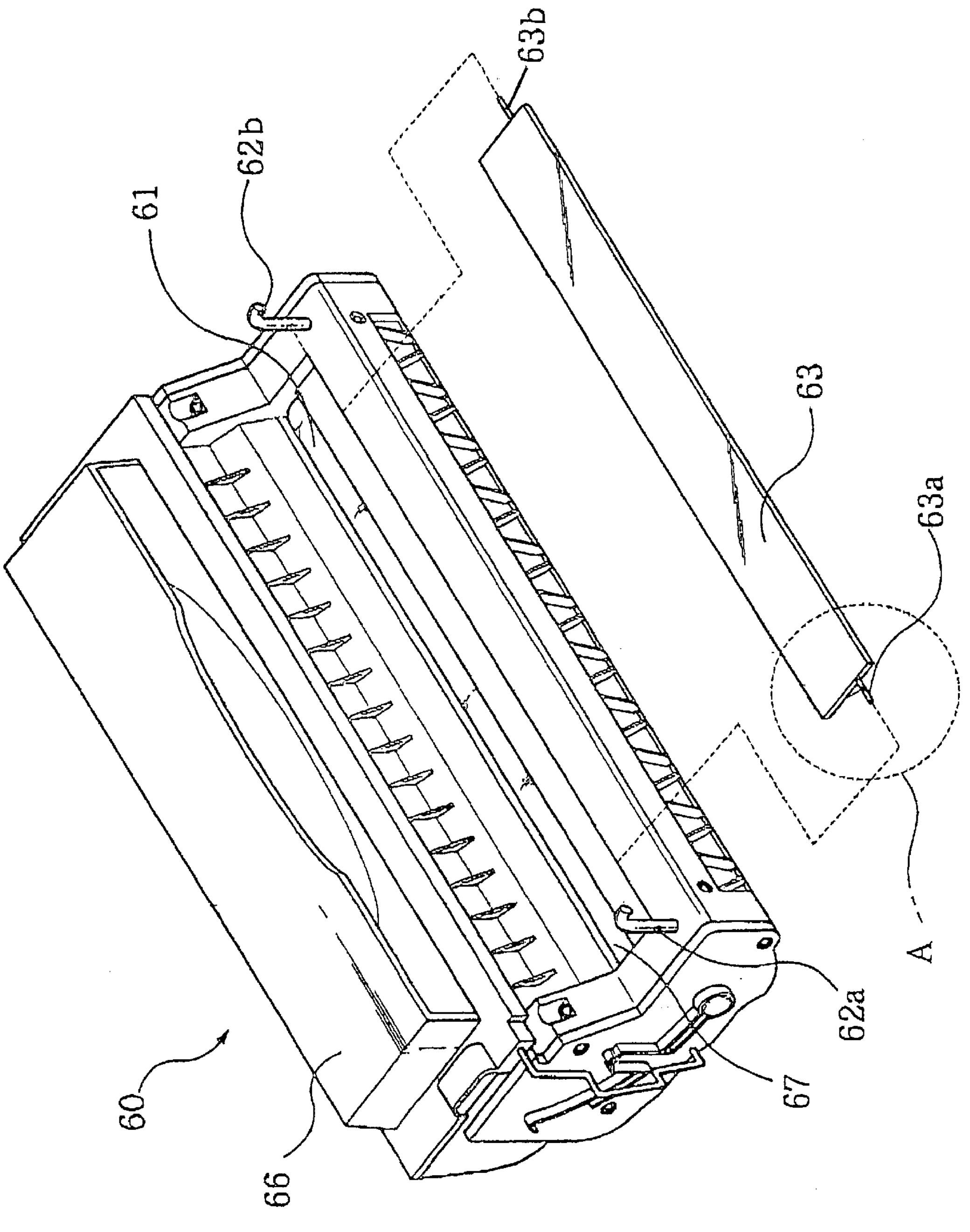
FIG. 4 is a perspective view of a developing device disposed at the image forming apparatus according to the present invention.

Meanwhile, the developing device 60, as shown in FIG. 4, is provided with a toner storing portion 66 which is disposed at an upper portion thereof, the photosensitive drum 61 which is disposed at a front portion thereof, and a feed roller, a developing roller and a charge roller (which are not shown). At a lower portion of the developing device 60, there is provided a lower protecting plate 65 for covering an exposed portion of the photosensitive drum 61, which is exposed to the outside. At the upper portion of the developing device 60, there is provided a exposing hole 67 so that a surface of the photosensitive drum 61 is exposed to light irradiated from the laser scanning unit 53.

Further, the developing device 60 has an upper protecting plate 63 for preventing a penetration of the external light into the: photosensitive drum 61 when the developing device 60 is exposed to the outside or the cover 51 of the main body 50 is opened. The upper protecting plate 63 is formed into a square shape and formed with a supporting protrusions 63*a* and 63*b* which engage with a supporting portions 62*a* and 62*b* respectively, formed at both ends of the developing device 60. By the engagement of the supporting protrusions 63*a* and 63*b* with supporting portions 62*a* and 62*b* , the upper protecting plate 63 can be rotated with the supporting protrusions 63*a* and 63*b* in the center.

Figure 5:
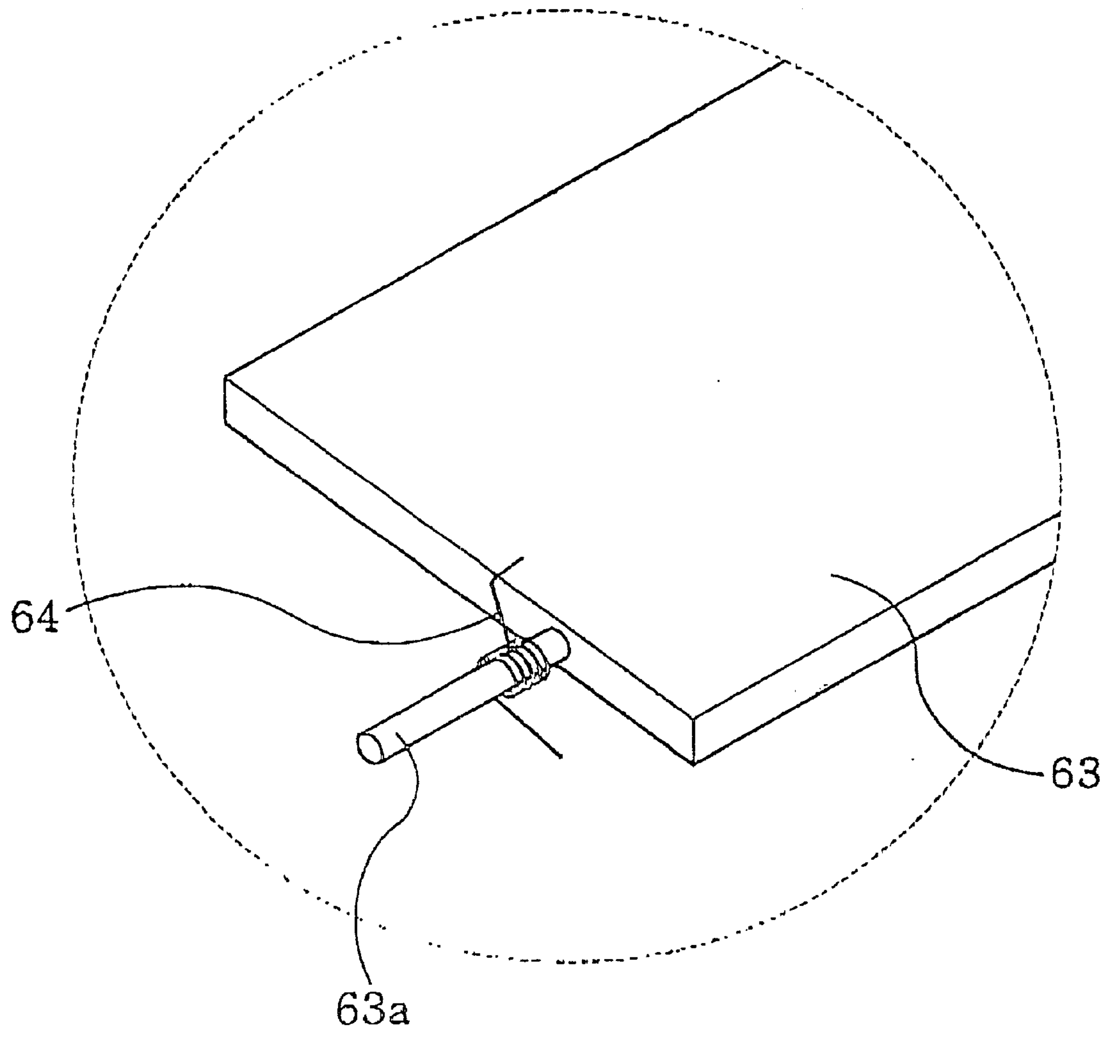
FIG. 5 is an enlarged view of portion "A" of FIG. 4.

Referring to FIG. 5, the supporting protrusion 63*a* has a torsion spring 64 one end of which is supported by an upper face of the upper protecting plate 63 and the other end is supported by the developing device 60 to return the upper protecting plate 63 to the exposing hole 67. The upper protecting plate 63 is operated by the opening/closing of the cover 51. Thus, the duct structure 51*a* disposed at the lower portion of the cover 51 is integrally formed with an operational protrusion 51*b*.

Here, an operation of the image forming apparatus according to the present invention as described above will be described more fully. As shown in FIG. 2, in case the cover 51 is closed, the operational protrusion 51*b* formed at the duct structure 51*a* of the cover 51 presses a side of the upper plate 63 of the developing device 60. Therefore, the upper protecting plate 63 is rotated upward from the exposing hole 67 of the developing device 60 so that the laser light from the laser scanning apparatus 53 is provided to the photosensitive drum 61. In this situation, when a paper sheet is fed by the feed roller 55, an image is printed through the photosensitive drum 61 and the transfer roller 56 on the paper sheet. Then, the paper sheet is discharged through the pressure roller 57 and a heat roller 58.

Referring to the FIG. 3, when the cover 51 of the main body 50 is rotated to open the main body 50, the operational protrusion 51*b* formed at the duct structure 51*a* of the cover 51 is rotated upward along with the cover 51. Therefore, an external force exerted on the upper protecting plate 63 by the operational protrusion 51*b* is eliminated. And the upper protecting plate 63 is rotated by a returning force of the torsion spring 64. The exposing hole 67 is closed. Therefore, although the cover 51 is opened, the photosensitive -drum 61 is not exposed through the exposing hole 67 of the developing device 60 to be properly protected from the external light.

As described above, the image forming apparatus according to the present invention is provided with the upper protecting plate for protecting the exposed portion of the photosensitive drum through the exposing hole through which the photosensitive drum is exposed to the light from the laser scanning unit. The operational protrusion is provided at the cover of the main body to operate the upper protecting plate, thereby preventing the photosensitive drum from being exposed to the external light when the cover of the main body is opened/closed.

It will be apparent to those skilled in the art that various modifications and variations of the present invention can be made without departing from the spirit or scope of the invention. Thus, it is intended that the present invention cover the modifications and variations of this invention provided they come within the scope of the appended claims and their equivalents.

What is claimed is:

1. An image forming apparatus, comprising:

a main body;

a cover for opening/closing a portion of the main body;

a laser scanning unit for irradiating a laser light on a photosensitive drum disposed at a developing device;

a exposing hole which is formed at a side of the developing device to exposing a surface of the photosensitive drum to the light from the laser scanning unit; and a protecting plate for covering the exposing hole to protect the exposing hole from external light when the cover is opened, wherein the developing device is provided with a supporting portion which is engaged with the protecting plate, and the cover is formed with an operational protrusion to rotate the protecting plate and thus expose the exposing hole, wherein the protecting plate is formed with a supporting protrusion which is engaged with the supporting portion, and the supporting protrusion has a returning spring for returning the protecting plate when an external force exerted by the operational protrusion is eliminated.

2. An image forming apparatus, comprising:

a cover for opening and closing a main body of said image forming apparatus;

a developing device comprising a photosensitive drum on which images are formed and then transferred to sheets of recording medium;

a laser scanner unit illuminating said photosensitive drum through an exposing hole, forming said images on said photosensitive drum; and a plate for covering said exposing hole automatically when said cover of said image forming apparatus is opened, wherein said plate comprises a spring that causes said plate to cover said photosensitive drum absent external pressure from said cover.

3. The image forming apparatus of claim 2, wherein said plate is pivotally attached to a supporting portion and rotates to expose or cover said exposing hole.

4. The image forming apparatus of claim 3, wherein a projection attached to said cover causes said plate to pivot upwards exposing said photosensitive drum to said laser scanner unit when said cover to said image forming apparatus is closed, and allows said plate to cover said photosensitive drum when said cover to said image forming apparatus is opened.

5. A method for protecting an image on a photosensitive drum of an image forming apparatus, comprising the steps of:

illuminating a photosensitive drum via a laser scanning unit located inside said image forming apparatus; and opening a cover to said image forming apparatus, said photosensitive drum and said laser scanning movement remaining stationary during said opening step automatically causing a plate to cover said photosensitive drum at a location on said drum where light from said laser scanning unit exposes a portion of said photosensitive drum preventing light external to said image forming apparatus from illuminating said photosensitive drum.

6. The method of claim 5, further comprising the steps of: closing said cover of said image forming apparatus automatically causing said plate to uncover said portion of said photosensitive drum allowing said laser scanning unit to illuminate said photosensitive drum.

7. The method of claim 6, wherein said cover comprises a protrusion that directly engages said plate and causes said plate to rotate to an open position when said cover to said image forming apparatus is closed.

8. An image forming apparatus, comprising:

a laser scanning unit irradiating laser light on a photosensitive drum disposed in a developing device;

a exposing hole disposed over a surface of said photosensitive drum to enable light from said laser scanning unit to irradiate and form an image on said photosensitive drum;

a protecting plate capable of covering said exposing hole; and a cover that rotates open to expose said laser scanning unit, said photosensitive drum and said protecting plate, said laser scanning unit, said photosensitive drum and said protecting plate being stationary as said cover opens and closes, said protecting plate automatically covering said exposing hole when said cover is opened prohibiting light and dust from reaching said photosensitive drum when said cover is opened, said protecting plate automatically uncovering said exposing hole when said cover is closed.

9. The apparatus of claim 8, said cover having an operational protrusion attached thereto, said operational protrusion contacting said protecting plate when said cover is opened and closed automatically causing said protecting plate to cover and uncover said exposing hole respectively.

10. The apparatus of claim 9, said protecting plate being pivotally attached to a supporting member, said supporting member being stationary during opening and closing of said cover, said operational protrusion causing said protecting plate to rotate about said supporting member to cover and uncover said exposing hole during opening and closing respectively of said cover.

11. The apparatus of claim 10, said protecting plate having a pair of protrusions enabling said protecting plate to rotate about said supporting member, each of said protrusions having a torsion spring biasing said protecting plate to cover said exposing hole absent contact of said operational protrusion attached to said cover with said protecting plate.

12. An image forming apparatus, comprising a cover and a main body, said cover being able to open and close onto said main body, said cover being hingedly attached to said main body, said main body comprising:

a toner storing portion;

a developing device;

a photosensitive drum, said photosensitive drum receiving toner from said toner storage unit;

a laser scanning unit exposing, through an exposing hole, toner disposed on said photosensitive drum; and a protecting plate covering said exposing hole protecting said photosensitive drum from foreign material and unwanted light when said cover is rotated open from said main body.

13. The image forming apparatus of claim 12, said cover comprising an operational protrusion that directly contacts said protecting plate upon opening and closing of said cover enabling light from sources other than said laser scanning unit from exposing toner on said photosensitive drum when said cover is rotated open.

14. The image forming apparatus of claim 13, said main body further comprising a supporting portion, said protecting plate being pivotally attached to said supporting portion, said protecting plate being spring biased to cover said exposing hole absent influence of said operational protrusion on said cover.

* * * * *